C. LEACH.
CLUTCH CONTROL LEVER.
APPLICATION FILED JULY 24, 1919.

1,341,566.

Patented May 25, 1920.

Inventor.
Corey Leach.
by Lacey & Lacey,
his Atty's.

UNITED STATES PATENT OFFICE.

COREY LEACH, OF CAPAC, MICHIGAN.

CLUTCH-CONTROL LEVER.

1,341,566.  Specification of Letters Patent.  Patented May 25, 1920.

Application filed July 24, 1919. Serial No. 313,091.

*To all whom it may concern:*

Be it known that I, COREY LEACH, a citizen of the United States, residing at Capac, in the county of St. Clair and State of Michigan, have invented certain new and useful Improvements in Clutch-Control Levers, of which the following is a specification.

The object of this invention is to provide a simple and inexpensive device which may be readily applied to a Fordson tractor without necessitating the boring of any bolt holes or other changes in the construction of the tractor and by which a single operator will be enabled to crank the engine and throw the clutch into operative connection with the band pulley shaft so that the tractor may be employed to drive other machinery. The Fordson tractor is provided with a shaft extending laterally from the casing of the transmission gear and adapted to receive a band pulley upon its outer end whereby the engine may be operatively connected with a threshing machine or other machinery. The clutch by which the transmission shaft of the engine is connected with the pulley shaft is controlled by a foot lever and the operator is ordinarily required to keep his foot upon this lever in order to hold the clutch disengaged so that when the pulley shaft is to be operated it is necessary for one man to crank the engine while another man holds the clutch inoperative. This objection has been overcome by my improvement.

One embodiment of my invention is illustrated in the accompanying drawings, in which—

Figure 1:
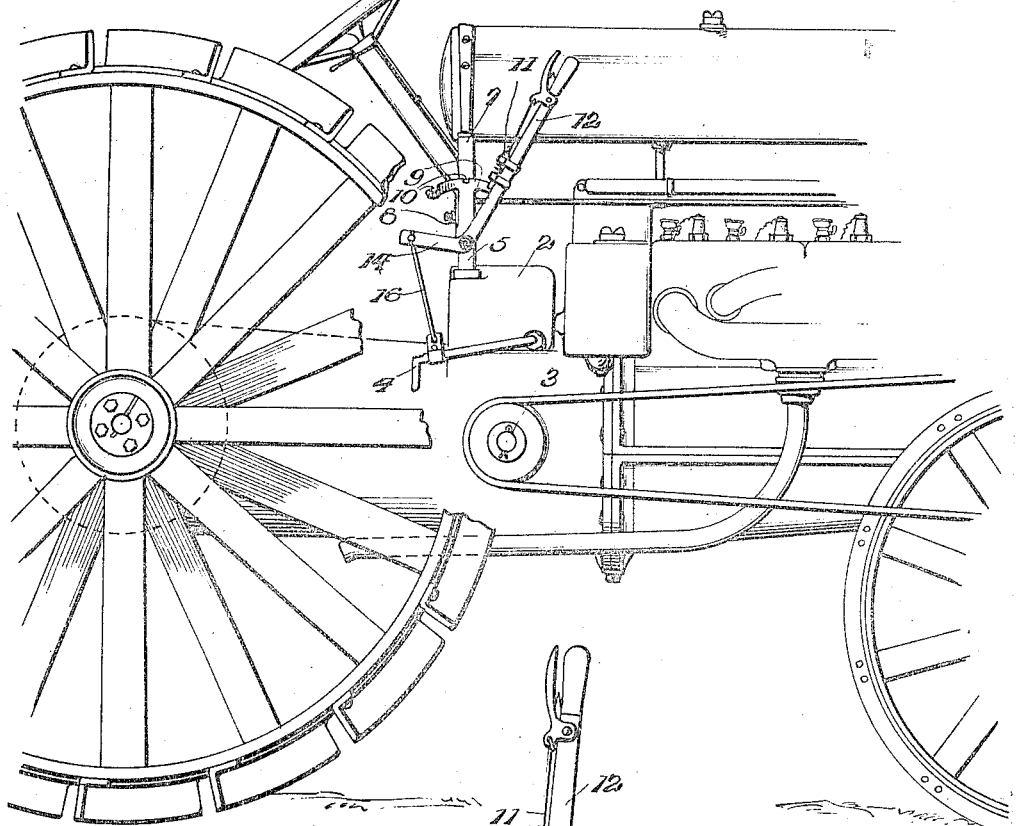
Figure 1 is a side elevation of so much of a tractor as is necessary to illustrate the application of the invention.

In the drawing, the reference numeral 1 indicates the tractor engine and 2 the casing of the transmission gearing from the lower portion of which a pulley shaft 3 projects laterally. The foot lever or pedal 4 is provided to control the clutch and ordinarily this is the only means provided for such purpose. In carrying out my invention, I employ a bracket 5 which is constructed with side flanges 6 adapted to engage against the sides of a standard 7 forming part of the tractor frame and a set screw 8 is mounted in one of said flanges to bear against the standard 7 and thereby secure the bracket in position. The upper end of the bracket is formed into or provided with a holding segment 9 provided with a plurality of notches 10 in its upper convex edge whereby the latch 11 of the hand lever 12 may be operatively engaged with the holding segment to maintain the lever in the position in which it is set. The lever 12 is fulcrumed at 13 concentric with the holding segment and is provided with a rearwardly extending arm 14. A link 16 has its upper end turned laterally, as shown at 17, to pivotally engage an opening provided therefor in the arm 14 at the end thereof and a cotter pin or other fastening 18 is provided on the extremity of the terminal 17 to maintain the parts in operative engagement. A clip 19 is secured upon the pedal 4 near the free end thereof and the lower end of the link 16 is pivotally secured in said clip.

When the lever 12 is set so that the latch thereon engages the rear notch in the holding segment, the clutch will be free. The engine may then be cranked without any liability of the clutch slipping and the operation of the driving elements of the gearing being started. After the engine has been cranked, the lever is moved forwardly to engage the latch 11 in the front notch 10 and the pedal 4 will be correspondingly moved inasmuch as the motion of the lever will be transmitted directly through the arm 14 and the link 16 to the pedal, the clutch being thereby thrown in and the pulley and machinery started. The latch will slip into engagement with the notch and the lever will be, therefore, securely held in the set position.

Figure 4:
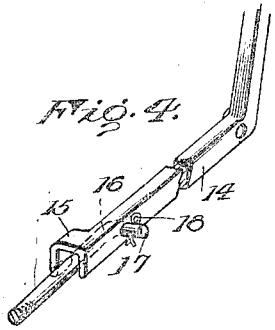
Fig. 4 is a detail perspective showing another embodiment of the invention.
Figure 2:
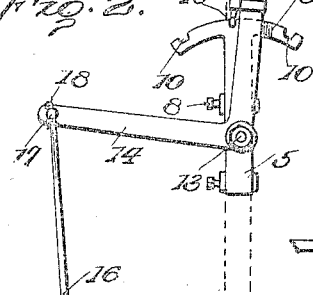
Fig. 2 is an enlarged side view of the clutch-controlling lever in its operative position.
Figure 3:
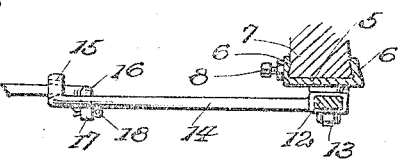
Fig. 3 is a section.

In the form of the invention shown in Figs. 3 and 4, the notched segment and the latch are omitted and a lateral overhanging lip 15 is provided at the free end of the arm 14, the link 16 being disposed in the plane of the lip so that when the arm 14 swings downwardly the lip engages over the link and forms a lock joint therewith and prevents upward movement of the pedal 4. When the lever is swung forward to let the clutch in, the arm 14 and the pedal 4 will move upwardly and the angular relation of the link to the pedal and the arm will hold the parts against accidental release. When the lever is thrown rearwardly, however, to throw out the clutch, the link assumes a position more nearly parallel with the pedal and its power of resistance to the upward movement of the pedal is, therefore, reduced, but inasmuch as the lip 15 is then brought into engagement with the link, the tendency of the link to move upwardly will be overcome and the parts will be locked.

My improved hand lever and its parts are exceedingly simple and may be readily attached to the tractor without requiring any change in the same and it may be applied by any unskilled person.

Having thus described the invention, what is claimed as new is:

A device for the purpose set forth comprising a lever provided with a rearwardly projecting arm having a laterally extending lip at its rear end, means for securing said lever upon the frame of a tractor, and a link pivotally attached to the said arm and arranged to be engaged by said lip and operatively connecting the said arm with the clutch-controlling element of the tractor.

In testimony whereof I affix my signature.

COREY LEACH. [L. S.]